US010021353B2

(12) United States Patent
Grimberg

(10) Patent No.: US 10,021,353 B2
(45) Date of Patent: Jul. 10, 2018

(54) OPTIMIZING DETECTION OF KNOWN LIGHT SOURCES

(71) Applicant: OPGAL OPTRONIC INDUSTRIES LTD., Karmiel (IL)

(72) Inventor: Ernest Grimberg, Kiriat Bialik (IL)

(73) Assignee: OPGAL Optronic Industries Ltd., Karmiel (IL)

( * ) Notice: Subject to any disclaimer, the term of this patent is extended or adjusted under 35 U.S.C. 154(b) by 254 days.

(21) Appl. No.: 14/760,496

(22) PCT Filed: Jan. 13, 2014

(86) PCT No.: PCT/IL2014/050031
§ 371 (c)(1),
(2) Date: Jul. 13, 2015

(87) PCT Pub. No.: WO2014/108905
PCT Pub. Date: Jul. 17, 2014

(65) Prior Publication Data
US 2015/0358588 A1 Dec. 10, 2015

(30) Foreign Application Priority Data
Jan. 13, 2013 (IL) .......................... 224200

(51) Int. Cl.
*H04N 7/18* (2006.01)
*H04N 5/235* (2006.01)
(Continued)

(52) U.S. Cl.
CPC .......... *H04N 7/181* (2013.01); *G06K 9/00771* (2013.01); *G06K 9/6277* (2013.01);
(Continued)

(58) Field of Classification Search
CPC .......... G08G 5/00; G01C 23/00; B64D 47/04; B64D 47/08; G06K 9/00
(Continued)

(56) References Cited

U.S. PATENT DOCUMENTS

| 6,556,237 B1 | 4/2003 | Fredlund et al. |
| 8,134,141 B2 | 3/2012 | Krishna et al. |

(Continued)

FOREIGN PATENT DOCUMENTS

| CN | 1700082 | 11/2005 |
| CN | 102273194 | 12/2011 |
| WO | WO 2001/030011 | 4/2001 |

OTHER PUBLICATIONS

International Search Report of PCT Application No. PCT/IL2014/050031, dated Jun. 5, 2014.
(Continued)

*Primary Examiner* — Andy Rao
(74) *Attorney, Agent, or Firm* — Pearl Cohen Zedek Latzer Baratz LLP

(57) ABSTRACT

A method of optimizing detection of known light sources is provided herein. The method may include: positioning a plurality of cameras having different spectral bands to have at least partially identical fields of view in respect to a view that contains the light sources; capturing images of the light sources by the cameras at different spectral bands; estimating, for each pixel and all cameras, relative fraction values of collected sun light and of collected light sources; deriving, for each pixel, optimal fraction values of sun light and of the light sources, by minimizing, for each pixel, a mean square error estimation of an overall radiation with respect to the estimated relative fraction values.

22 Claims, 5 Drawing Sheets

(51) Int. Cl.
*H04N 5/14* (2006.01)
*G06K 9/00* (2006.01)
*H05B 37/03* (2006.01)
*H04N 5/247* (2006.01)
*G06K 9/62* (2006.01)

(52) U.S. Cl.
CPC ........... *H04N 5/147* (2013.01); *H04N 5/2351* (2013.01); *H04N 5/247* (2013.01); *H05B 37/03* (2013.01)

(58) Field of Classification Search
USPC .................................. 348/113–119, 143–160
See application file for complete search history.

(56) References Cited

U.S. PATENT DOCUMENTS

| | | |
|---|---|---|
| 2003/0123583 A1 | 7/2003 | Yellin et al. |
| 2004/0080620 A1 | 4/2004 | Silverbrook |
| 2005/0232512 A1 | 10/2005 | Luk et al. |
| 2006/0238714 A1 | 10/2006 | Fox et al. |
| 2007/0024701 A1 | 2/2007 | Prechtl et al. |
| 2007/0058757 A1 | 3/2007 | Kusume |
| 2009/0243493 A1 | 10/2009 | Bergquist |
| 2011/0205395 A1 | 8/2011 | Levy |
| 2012/0007979 A1* | 1/2012 | Schneider ............... G01J 3/36 348/116 |
| 2012/0050307 A1 | 3/2012 | Mahowald et al. |
| 2012/0169842 A1 | 7/2012 | Chuang et al. |
| 2012/0176483 A1 | 7/2012 | Border et al. |

OTHER PUBLICATIONS

Office Action of IL Application No. 224200, dated May 1, 2013.
Office Action of IL Application No. 224200, dated May 29, 2014.
Magdeleine Dinguirard et al.: "Calibration of Space-Multispectral Imaging Sensors", Remote Sensing of Environment, vol. 68, No. 3, Jun. 30, 1999; pp. 194-205.
Extended Search Report of EP Patent Application No. 14738244.4, dated Sep. 19, 2016.
Office action of Chinese Patent Application No. 2014800086119, dated May 27, 2017.

* cited by examiner

*200*

- 210 — POSITIONING SEVERAL CAMERAS HAVING DIFFERENT SPECTRAL BANDS TO HAVE A MAXIMAL COMMON FIELD OF VIEW
- 212 — RESIZING THE VIDEO SIGNAL FROM THE DIFFERENT CAMERAS SO THAT THE INSTANTANEOUS FIELD OF VIEW EACH PIXEL WILL HAVE THE SAME VALUE FOR ALL CAMERAS USED
- 214 — NORMALIZING THE VIDEO SIGNAL FROM THE DIFFERENT CAMERAS SO THAT THE SENSOR OUTPUT VOLTAGE TO LIGHT ENERGY INPUT CONVERSION RATIOS HAVE THE SAME VALUES FOR ALL CAMERAS USED
- 220 — CAPTURING IMAGES OF LIGHT SOURCES BY THE CAMERAS AT DIFFERENT SPECTRAL BANDS
- 225 — USING PREVIOUSLY ESTIMATED OR MEASURED RELATIVE FRACTION VALUES FOR EACH CAMERA AND EACH LIGHT SOURCE
- 230 — ESTIMATING, FOR EACH PIXEL AND ALL CAMERAS, RELATIVE FRACTION VALUES OF COLLECTED SUN LIGHT AND OF COLLECTED LIGHT SOURCES
- 240 — MINIMIZING, FOR EACH PIXEL, A MEAN SQUARE ERROR ESTIMATION OF THE OVERALL RADIATION WITH RESPECT TO THE ESTIMATED FRACTION VALUES
- 250 — DERIVING, FOR EACH PIXEL, OPTIMAL FRACTION VALUES OF SUN LIGHT AND OF THE LIGHT SOURCES BASED ON THE MINIMIZATION

Figure 3

OPTIMIZING DETECTION OF KNOWN LIGHT SOURCES

CROSS-REFERENCE TO RELATED APPLICATIONS

This application is a National Phase Application of PCT International Patent Application No. PCT/IL2014/050031, International Filing Date Jan. 13, 2014, entitled: "OPTIMIZING DETECTION OF KNOWN LIGHT SOURCES", published on Jul. 17, 2014 as International Patent Application Publication No. WO 2014/108905, claiming priority of Israel Patent Application No. 224200, filed Jan. 13, 2013, both of which are incorporated herein by reference in their entireties.

TECHNICAL FIELD

The present invention relates to the field of image processing, and more particularly, to light source detection.

BACKGROUND OF THE INVENTION

Detecting light sources may be a crucial image processing issue, as for example is the case with detecting runway lights in spite of intense solar radiation.

U.S. Patent Publication No. 2012007979 discloses an apparatus for detecting airfield light emitters, having light detection cameras, each detecting at least one respective waveband of electromagnetic radiation within the electromagnetic spectrum, each of the light detection cameras producing a plurality of respective spectral images, and a processor coupled with the light detection cameras, thereby generating a multispectral image of the airfield light emitters from the spectral images. The multispectral image includes a multi-dimensional set of spectral values, wherein the processor further determines which combination of the multi-dimensional set of spectral values corresponds to distinct light emission characteristics of the airfield light emitters by identifying a particular spectral signature corresponding to the multi-dimensional set of spectral values, wherein the processor produces an enhanced image from those spectral values of the multi-dimensional set of spectral values which correspond to the determined combination. US2012007979 requires maintaining databases of both airfield light emitters and of the light emitters particular spectral signatures in order to complete the identification. Furthermore, the apparatus must carry out a registration process of its position in respect to the airfield prior to the implementation of the identification process.

SUMMARY OF THE INVENTION

One aspect of the present invention provides a method of optimizing detection of known light sources (e.g. runway lights), comprising: (i) positioning a plurality of cameras having different spectral bands to have at least partially identical fields of view in respect to a view that contains the light sources; (ii) capturing images of the light sources by the cameras at different spectral bands; (iii) estimating, for each pixel and all cameras involved in the process, relative fraction values of collected sun light and of collected light sources; and (iv) deriving, for each pixel, optimal fraction values of sun light and of the light sources, by minimizing, for each pixel, a mean square error estimation of an overall radiation with respect to the estimated relative fraction values.

In embodiments, the captured images may be part of a video signal which may be resized in such a way that the instantaneous field of view of all pixels of all different cameras involved in the process will have the same value. Additionally, the captured images (e.g. as part of the video signal) of all cameras involved in the process may be normalized so that the voltage signal to light collected power conversion ratio is identical for all the cameras. The calibration and normalization may take into account the exposure time of each camera.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
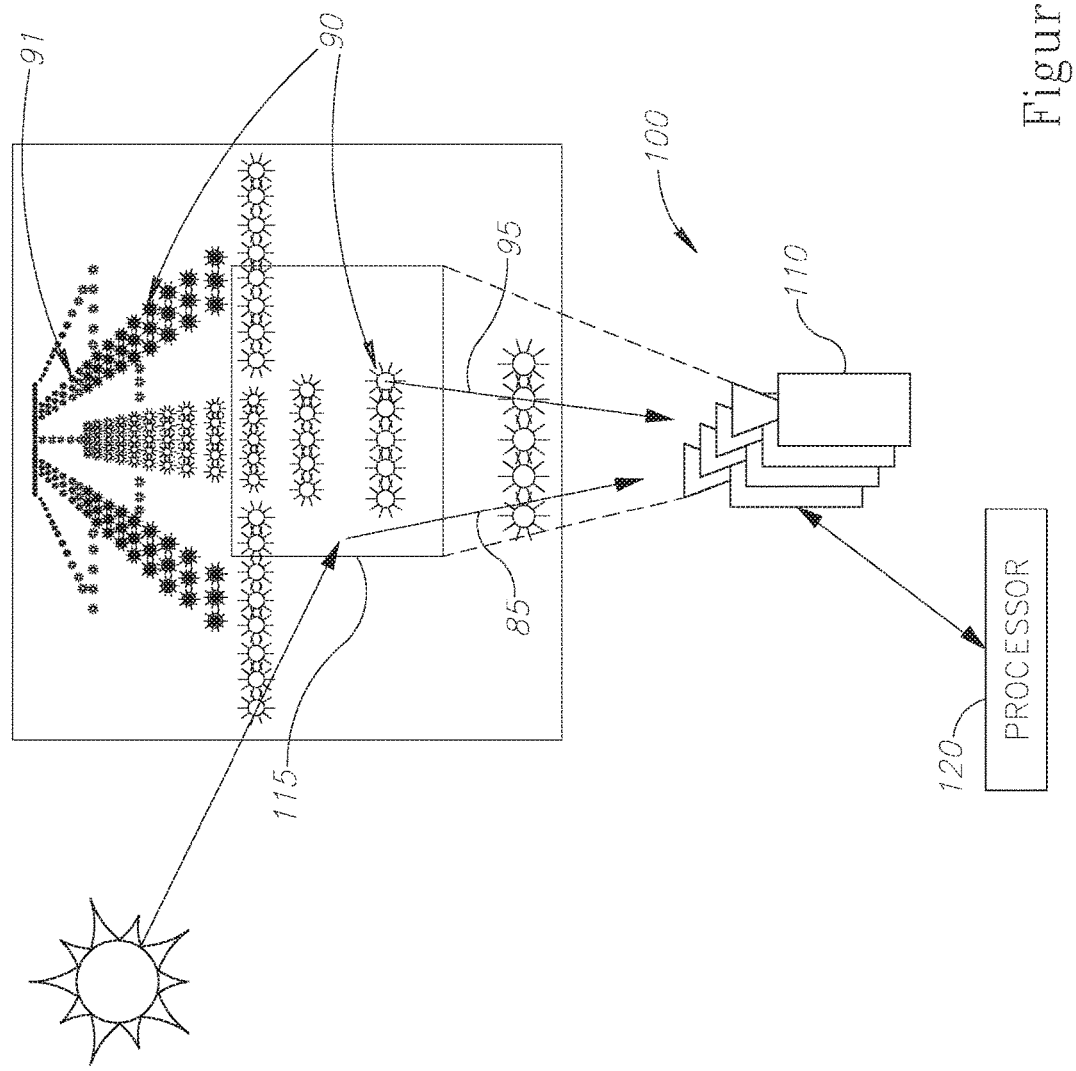
FIG. 1 is a high level schematic block diagram of a system for detection of known light sources, according to some embodiments of the invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram of a system 100 for detection of known light sources 90, according to some embodiments of the invention. In the illustrated example, light sources 90 are runway lights of a landing area 91. Light sources 90 may be incandescent, or may produce light by other means, e.g. be LEDs. Light sources 90 are detected with respect to ambient light such as sunlight reflected from the surrounding, moon light, or other artificial or natural light sources.

System 100 comprises a plurality of cameras 110 having different spectral bands, positioned to have at least partially identical fields of view 115 in respect to a view that contains light sources 90. In cases of only partially overlapping fields of view, the overlaps are used for the analysis.

Cameras 110 are arranged to capture images of light sources 90 at different spectral bands. Images for cameras 110 may be normalized with respect to gain and quantum efficiency, and corrected for geometrical effects. The images may be further normalized with respect to the pixel size of the different cameras 110. The captured images may be resized to yield equal instantaneous fields of view per corresponding pixels over all cameras 110. The captured images may be normalized to yield equal sensor output voltage to light energy input conversion ratios for all cameras 110. In embodiments, the captured images may be part of a video signal that may be calibrated and normalized to take into account the exposure time of each camera.

In embodiments, some of the camera optics may be common, e.g. some of the cameras 110 may have one set of optics and several detectors. For example, cameras 110 may have a common spectral reflective/transmitting optical element, splitting the light to different detectors. The plurality of cameras 110 may be realized by a plurality of detectors with shared optics. For example, if the view is changing slowly, a single camera 110 may be used to acquire several spectral bands by using e.g. a rotating wheel with band pass filters, or an interference device such as a Fabry Perot interferometer. Cameras 110 may comprise to one or more video camera. The use of the term "camera" is hence not limited to the whole device, but relates to the spectral ranges that are measured.

System 100 further comprises a processor 120 arranged to estimate, for each pixel and all cameras 110, relative fraction values of collected ambient light such as sun light 85 (e.g. reflected of the ground) and collected light 95 from artificial, man-made light sources 90 by minimizing, for each pixel, a mean square error estimation of an overall radiation with respect to the estimated relative fraction values, as explained below.

Processor 120 is further arranged to derive, for each pixel, optimal fraction values (in terms of minimal mean square error) of ambient light such as sun light 85 and of light 95 from man-made light sources 90, based on the minimization, and detect light sources 90 by applying the derived optimal fraction values. Processor 120 may identify and attenuate or disregard the camera 110 with a lowest signal to noise ratio to derive the optimal fraction values. The camera that has the lowest signal to noise has the highest influence on the result because it is the weakest link in the computing chain. It has the highest errors for the values provided, and hence may be attenuated or ignored to improve the estimation. In such case, the entire computational process is reiterated with the new data.

Processor 120 may be further arranged to use the optimal values to enhance imaging by any one of the cameras. Processor 120 may be further arranged to use the optimal values to enhance imaging by a camera in a different spectral range.

In embodiments, processor 120 may be further arranged to use the optimal values to enhance image fusion, e.g. of the images captured by cameras 110, and/or image fusion of some of these images with additional images or data.

In the following non-limiting example, system 100 and method 200 (FIG. 3) are illustrating for four cameras 110 with mutually exclusive spectral ranges.

Figure 2A:
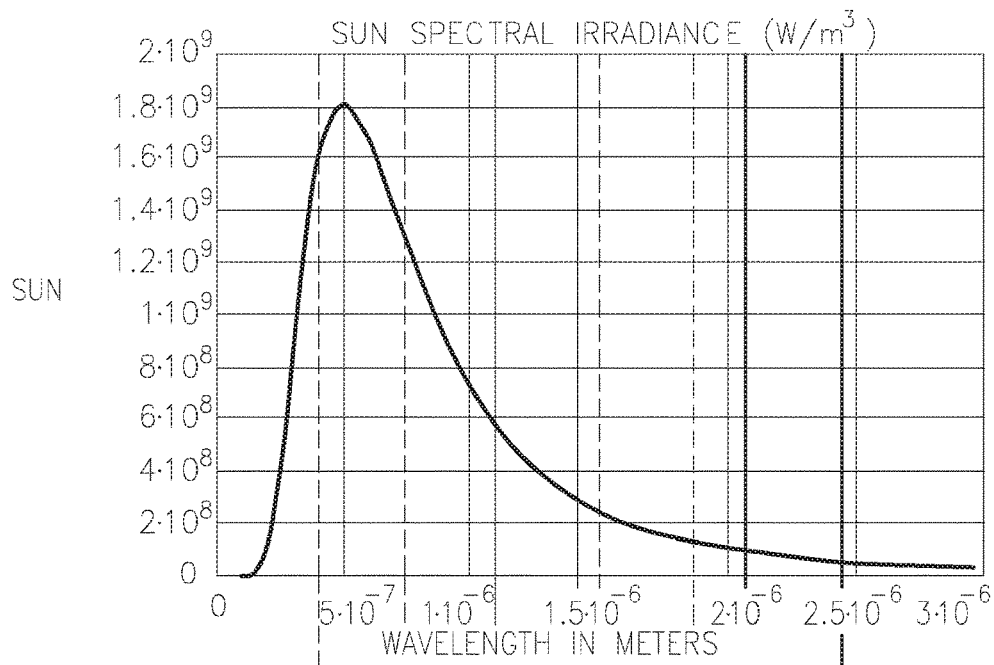
FIGS. 2A and 2B are schematic illustrations of the spectra of sun light and of light from light sources, respectively, with respect to cameras' bandwidths, according to some embodiments of the invention.
Figure 2B:
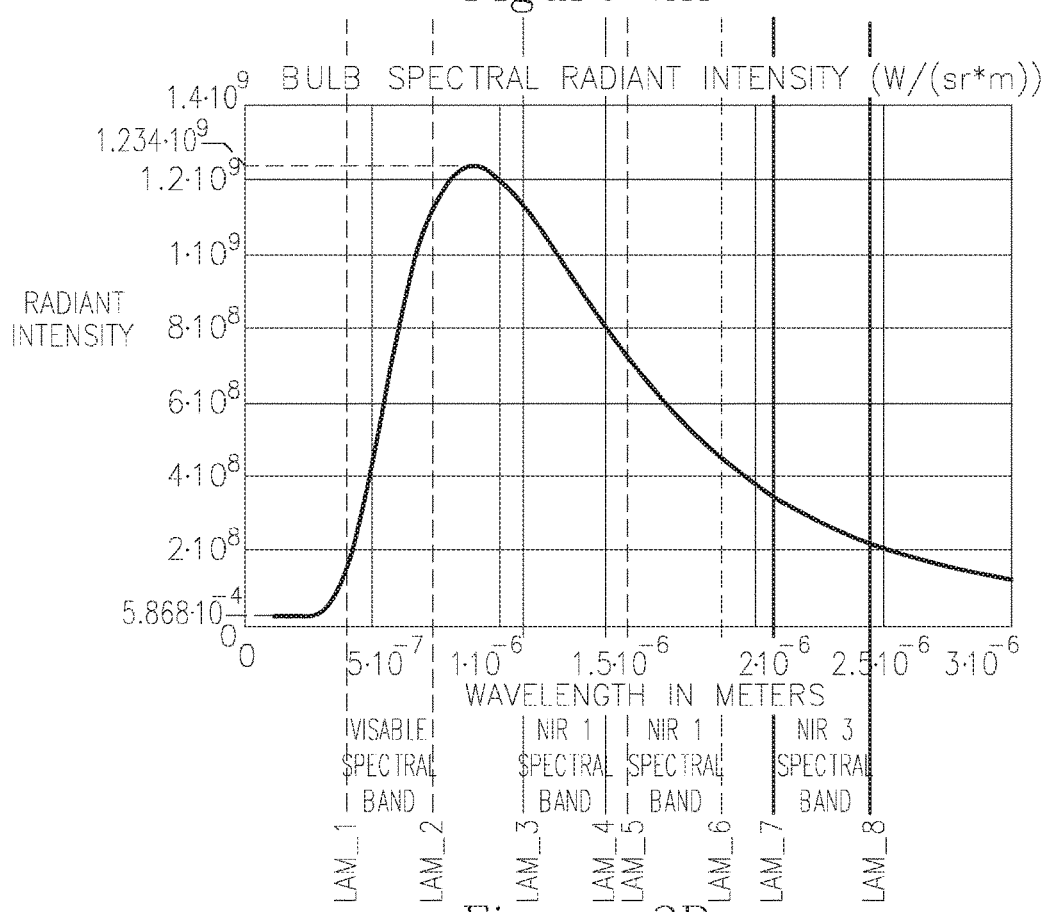

FIGS. 2A and 2B are schematic illustrations of the spectra of sun light 85 and of light 95 from light sources 90, respectively, with respect to cameras 110's bandwidths, according to some embodiments of the invention. In this non-limiting example, a first camera 110 is in the visible spectral band while three cameras 110 are in different near infrared (NIP) spectral band. The spectral bands are denoted by: lam_1 . . . lam_2, lam_3 . . . lam_4, lam_5 . . . lam_6, lam_7 . . . lam_8, respectively.

Figure 3:
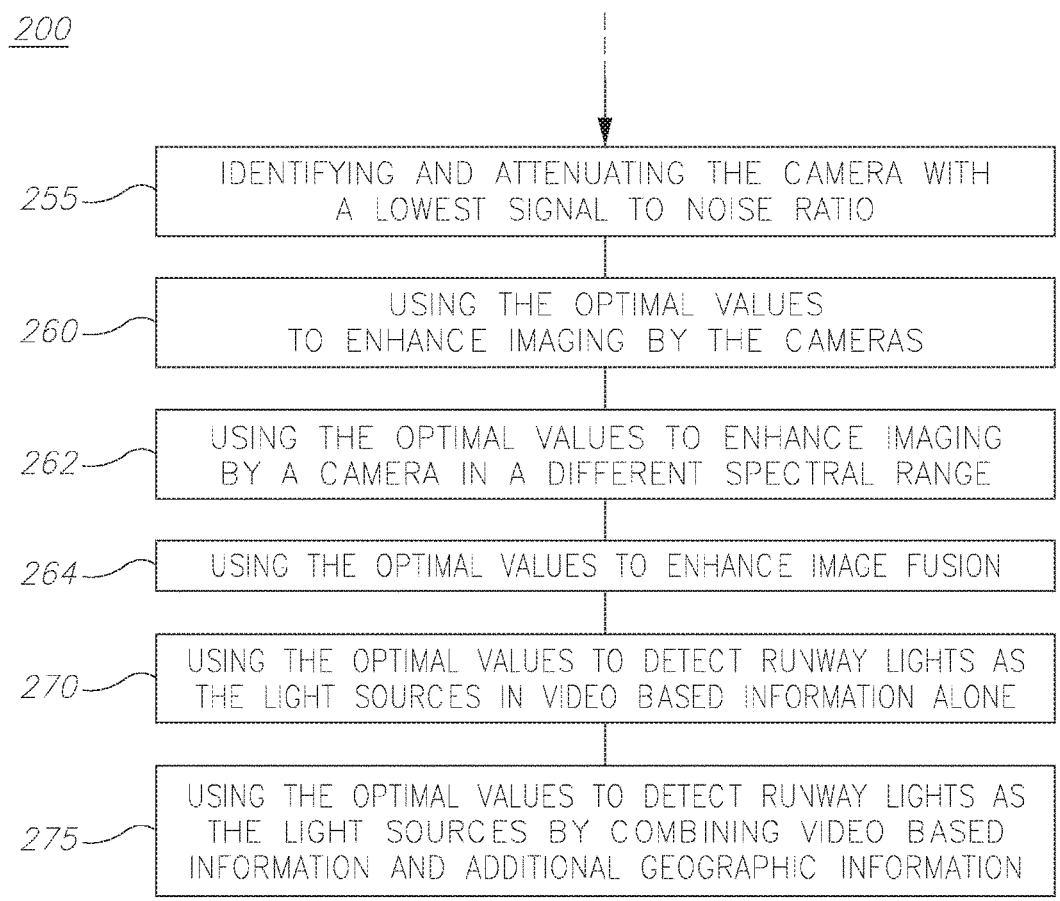
FIG. 3 is a schematic high level flowchart that illustrates a method of optimizing detection of known light sources, according to some embodiments of the invention.

FIG. 3 is a schematic high level flowchart that illustrates a method 200 of optimizing detection of known light sources, according to some embodiments of the invention.

Method 200 comprises the following stages: Positioning several cameras having different spectral bands to have a maximal common field of view (stage 210); capturing images of runway light by the cameras at different spectral bands (stage 220); using previously estimated or measured relative fraction values for each camera and each light source (stage 225) or optionally estimating, for each pixel and all cameras, relative fraction values of collected sun light and of collected runway lights (stage 230); minimizing, for each pixel, a mean square error estimation of the overall radiation with respect to the estimated fraction values (stage 240); and deriving, for each pixel, optimal fraction values of sun light and of runway lights, based on the minimization (stage 250).

Method 200 may further comprise resizing the captured images (e.g. as part of a video signal) from different cameras to yield equal values for the instantaneous fields of view per corresponding pixels over all cameras (stage 212).

Method 200 may further comprise normalizing the captured images e.g. as part of a video signal) to yield equal sensor output voltage to light energy input conversion ratios for all cameras (stage 214).

Method 200 may further comprise identifying and attenuating or ignoring the camera with a lowest signal to noise ratio to derive the optimal fraction values (stage 255). In case stage 255 is carried out, the entire computational process is reiterated with the new data.

In embodiments, method 200 comprises using the optimal values to enhance imaging by the cameras (stage 260) or to enhance imaging by a camera in a different spectral range (stage 262).

In embodiments, method 200 comprises using the optimal values to enhance image fusion of the images (stage 264).

In embodiments, method 200 comprises using the optimal values to detect runway lights as the light sources in video based information alone (stage 270).

In embodiments, method 200 comprises using the optimal values to detect runway lights as the light sources by combining video based information and additional geographic information (stage 275).

Stages 225, optionally 230, 240, 250 and 255 may be realized for the non-limiting example by the steps explained in the following. The following notation is used to designate the parameters relating to the cameras and the light sources that are to be detected. These parameters may be estimated by a computational method or measured before method 200 is carried out. The parameters $K\_sun_i$ denote the ratio between the fraction of sun light collected by the $i^{th}$ camera in its spectral range, and the sum of all fractions of sun light collected by all cameras. The parameters K_bulb$_i$ denote the ratio between the fraction of light from the artificial light source collected by the i$^{th}$ camera in its spectral range, and the sum of all fractions of light from the artificial light source collected by all cameras. Light sources 90 are referred to, in the following, as runway lights, without limiting the generality of the invention.

Assuming that the light collected by each pixel of cameras 110 is a linear combination of the collected reflection 85 of sun light and light 95 emitted by the runway lights 90, processor 120 is configured to optimally estimate two numbers a and b, for each pixel, that describe the fraction value collected from reflected sun light 85 and the fraction collected from runway lights 90. The analysis presented below is for only one single pixel, and the estimations have to be repeated for the entire number of pixels. The analysis is mainly for incandescent light sources 90. For LED light sources 90, or light sources that have a limited spectrum in general, one of cameras 110 may have a spectral range beyond that of light sources 90, and its image may be used to derive sun light 85 directly.

First, the fractions of reflected sunlight 85 (short-sun, sun_sig) and of light sources 90 (short-bulb, bulb_sig) at each spectral bands are expressed as the ratio between the integrated radiation of the respective source in each spectral band to the sum of the integrated radiation of the respective source in each spectral band from all cameras 110.

Assuming ideal conditions, without any atmosphere, and background reflectivity equal one (1.0), the following relations exist:

$$K\_sun_1 = \frac{\int_{lam\_1}^{lam\_2} SUN\_sig(lam) \cdot dlam}{\int_{lam\_1}^{lam\_2} SUN\_sig(lam) \cdot dlam + \int_{lam\_3}^{lam\_4} SUN\_sig(lam) \cdot dlam + \int_{lam\_5}^{lam\_6} SUN\_sig(lam) \cdot dlam + \int_{lam\_7}^{lam\_8} SUN\_sig(lam) \cdot dlam}$$

$$K\_sun_2 = \frac{\int_{lam\_3}^{lam\_4} SUN\_sig(lam) \cdot dlam}{\int_{lam\_1}^{lam\_2} SUN\_sig(lam) \cdot dlam + \int_{lam\_3}^{lam\_4} SUN\_sig(lam) \cdot dlam + \int_{lam\_5}^{lam\_6} SUN\_sig(lam) \cdot dlam + \int_{lam\_7}^{lam\_8} SUN\_sig(lam) \cdot dlam}$$

$$K\_sun_3 = \frac{\int_{lam\_5}^{lam\_6} SUN\_sig(lam) \cdot dlam}{\int_{lam\_1}^{lam\_2} SUN\_sig(lam) \cdot dlam + \int_{lam\_3}^{lam\_4} SUN\_sig(lam) \cdot dlam + \int_{lam\_5}^{lam\_6} SUN\_sig(lam) \cdot dlam + \int_{lam\_7}^{lam\_8} SUN\_sig(lam) \cdot dlam}$$

$$K\_sun_4 = \frac{\int_{lam\_7}^{lam\_8} SUN\_sig(lam) \cdot dlam}{\int_{lam\_1}^{lam\_2} SUN\_sig(lam) \cdot dlam + \int_{lam\_3}^{lam\_4} SUN\_sig(lam) \cdot dlam + \int_{lam\_5}^{lam\_6} SUN\_sig(lam) \cdot dlam + \int_{lam\_7}^{lam\_8} SUN\_sig(lam) \cdot dlam}$$

$$SUN\_sig = \int_{lam\_1}^{lam\_2} SUN\_sig(lam) \cdot dlam + \int_{lam\_3}^{lam\_4} SUN\_sig(lam) \cdot dlam + \int_{lam\_5}^{lam\_6} SUN\_sig(lam) \cdot dlam + \int_{lam\_7}^{lam\_8} SUN\_sig(lam) \cdot dlam$$

wherein:

K_sun$_1$ represents the fraction of SUN signal 85 that is collected by the first camera 110 opened in the spectral band lam_1 . . . lam_2, K_sun$_2$ represents the fraction of SUN signal 85 that is collected by camera 110 opened in the spectral band lam_3 . . . lam_4, K_sun$_3$ represents the fraction of SUN signal 85 that is collected by camera 110 opened in the spectral band lam_5 . . . lam_6, K_sun$_4$ represents, the fraction of SUN signal 85 that is collected by camera 110 opened in the spectral band lam_7 . . . lam_8, and SUN_sig represents the total SUN signal 85 collected by the four cameras 110 in ideal conditions.

In a similar way:

$$K\_bulb_1 = \frac{\int_{lam\_1}^{lam\_2} bulb\_sig(lam) \cdot dlam}{\int_{lam\_1}^{lam\_2} bulb\_sig(lam) \cdot dlam + \int_{lam\_3}^{lam\_4} bulb\_sig(lam) \cdot dlam + \int_{lam\_5}^{lam\_6} bulb\_sig(lam) \cdot dlam + \int_{lam\_7}^{lam\_8} bulb\_sig(lam) \cdot dlam}$$

$$K\_bulb_2 = \frac{\int_{lam\_3}^{lam\_4} bulb\_sig(lam) \cdot dlam}{\int_{lam\_1}^{lam\_2} bulb\_sig(lam) \cdot dlam + \int_{lam\_3}^{lam\_4} bulb\_sig(lam) \cdot dlam + \int_{lam\_5}^{lam\_6} bulb\_sig(lam) \cdot dlam + \int_{lam\_7}^{lam\_8} bulb\_sig(lam) \cdot dlam}$$

$$K\_bulb_3 = \frac{\int_{lam\_5}^{lam\_6} bulb\_sig(lam) \cdot dlam}{\int_{lam\_1}^{lam\_2} bulb\_sig(lam) \cdot dlam + \int_{lam\_3}^{lam\_4} bulb\_sig(lam) \cdot dlam + \int_{lam\_5}^{lam\_6} bulb\_sig(lam) \cdot dlam + \int_{lam\_7}^{lam\_8} bulb\_sig(lam) \cdot dlam}$$

$$K\_bulb_4 = \frac{\int_{lam\_7}^{lam\_8} bulb\_sig(lam) \cdot dlam}{\int_{lam\_1}^{lam\_2} bulb\_sig(lam) \cdot dlam + \int_{lam\_3}^{lam\_4} bulb\_sig(lam) \cdot dlam + \int_{lam\_5}^{lam\_6} bulb\_sig(lam) \cdot dlam + \int_{lam\_7}^{lam\_8} bulb\_sig(lam) \cdot dlam}$$

$$bulb\_sig = \int_{lam\_1}^{lam\_2} bulb\_sig(lam) \cdot dlam + \int_{lam\_3}^{lam\_4} bulb\_sig(lam) \cdot dlam + \int_{lam\_5}^{lam\_6} bulb\_sig(lam) \cdot dlam + \int_{lam\_7}^{lam\_8} bulb\_sig(lam) \cdot dlam$$

wherein:

K_bulb$_1$ represents the fraction of the runway light signal 90 that is collected by the first camera 110 opened in the spectral band lam_1 . . . lam_2, K_bulb$_2$ represents the fraction of the runway light signal 90 that is collected by camera opened in the spectral band lam_3 . . . lam_4, K_bulb$_3$ represents the fraction of runway light signal 90 that is collected by camera opened in the spectral band lam_5 . . . lam_6, K_bulk$_4$ represents the fraction of runway light signal 90 that is collected by camera opened in the spectral band lam_7 . . . lam_8, and bulb_sig represents the total runway light signal 90 that is collected by the four cameras 110 in ideal conditions.

As SUN_sig and bulb_sig represent the total signal collected by the four cameras 110 from the light emitted by SUN signal 85 and incandescent runway light 90 respectively, the following values have to be measured or estimated before the process can be used for runway lights detection (stages 225 and optionally 230):

$K\_sun_i$ for $1 \leq i \leq 4$
$K\_bulb_i$ for $1 \leq i \leq 4$

The overall signals that are collected by cameras 110 are denoted $S_1 \ldots S_4$ and their sum is denoted by S. Expressly:

$$S = \sum_{i=1}^{4} S_i$$

$S_1$ denotes the light collected by the first camera 110, that collects light in the spectral band $lam\_1 \ldots lam\_2$,
$S_2$ denotes the light collected by camera 110 that collects light in the spectral band $lam\_3 \ldots lam\_4$,
$S_3$ denotes the light collected by camera 110 that collects light in the spectral band $lam\_5 \ldots lam\_6$,
$S_4$ denotes the light collected by camera 110 that collects light in the spectral band $lam\_7 \ldots lam\_8$, and Finally, the fraction values for reflected sun light 85 and light sources 90 are defined as "a" and "b" respectively, such that a+b=1 (wherein "a" indicates a probability that the pixel represents the collected sun light, and "b" indicates a probability that the pixel represents the collected light source).

An error is defined as the distance between a vector of estimated signals and a vector of actual signal over all cameras 110, wherein the estimated signal for each camera 110 is defined as "a" times the sun part of the signal plus "b" times the light source part of the signal, using the expressions presented above, namely:

$(a \cdot K\_sun_1 \cdot S + b \cdot K\_bulb_1 \cdot S - S_1)^2 + (a \cdot K\_sun_2 \cdot S + b \cdot K\_bulb_2 \cdot S - S_2)^2 + \ldots + (a \cdot K\_sun_3 \cdot S + b \cdot K\_bulb_3 \cdot S - S_3)^2 + (a \cdot K\_sun_4 \cdot S + b \cdot K\_bulb_4 - S_4)^2 = Error^2$ The optimal fraction values are then derived (stage 250) by minimizing the defined error (stage 240), namely by using the orthogonality principle to obtain the optimal solution directly from the equations, using the expression presented above:

$$\begin{cases} a + b = 1 \\ a \cdot S \cdot \sum_{i=1}^{4} K\_sun_i \cdot K\_bulb_i + b \cdot S \cdot \sum_{i=1}^{4} K\_bulb_i^2 = \sum_{i=1}^{4} S_i \cdot K\_sun_i \end{cases}$$

This set of equations describes the solution that has the minimum error for the values a and b. The condition for a valid solution is:

$$\sum_{i=1}^{4} K\_bulb_i^2 \neq \sum_{i=1}^{4} K\_sun_i \cdot K\_bulb_i$$

while a solution does not exist if:

$$\sum_{i=1}^{4} K\_bulb_i^2 = \sum_{i=1}^{4} K\_sun_i \cdot K\_bulb_i$$

$$a = \frac{S \cdot \sum_{i=1}^{4} K\_bulb_i^2 - \sum_{i=1}^{4} S_i \cdot K\_sun_i}{S \left( \sum_{i=1}^{4} K\_bulb_i^2 - \sum_{i=1}^{4} K\_sun_i \cdot K\_bulb_i \right)}$$

$$b = \frac{\sum_{i=1}^{4} S_i \cdot K\_sun_i - S \cdot \sum_{i=1}^{4} K\_sun_i \cdot K\_bulb_i}{S \left( \sum_{i=1}^{4} K\_bulb_i^2 - \sum_{i=1}^{4} K\_sun_i \cdot K\_bulb_i \right)}$$

In a non-limiting example, the following are the values for lam_i (in μm), the boundaries of the spectral ranges of cameras 110 (see also FIGS. 2A and 2B): lam_1=0.4 μm, lam_2=0.7 μm, lam_3=1.0 μm, lam_4=1.3 μm, lam_5=1.5 μm, lam_6=1.8 μm, lam_7=2.1 μm, lam_8=2.4 μm. Furthermore, it is assumed that cameras 110 are based on photon-counting detectors.

Using these values and the sun and light source spectra given in FIGS. 2A and 2B, the following are typical values for k_sun and k_bulb of cameras 110: $k\_sun_1=0.472$, $k\_sun_2=0.299$, $k\_sun_3=0.153$, $k\_sun_4=0.076$; $k\_bulb_1=0.114$, $k\_bulb_2=0.382$, $k\_bulb_3=0.307$, $k\_bulb_4=0.197$.

Use is made of the following fundamental theorem. Assuming independent random variables $S_1$, $S_2$ and their respective probability density functions $f_{s_1}(x)$, $f_{s_2}(x)$, the probability density function of variable "d" defined by the transform: $d = g(S_1, S_2)$ is equal to:

$$f_d(x, y) = \frac{f_{s_1}(x_1)}{|g'(x_1)|} \cdot \frac{f_{s_2}(y_1)}{|g'(y_1)|}$$

if $x_1$ $y_1$ are all real roots of $d = g(x_1, y_1)$ and $$g'(x) = \frac{dg(x)}{dx} \text{ and } g'(y) = \frac{dg(y)}{dy}$$

It is obvious from the mathematical expression for $f_d$ that the camera with the lowest signal to noise ratio (SNR) value is dominating the estimated value "a". It is further assumed that all cameras 110 have the same probability density function (PDF).

This paragraph estimates the influence of cameras signal to noise ratio on "a" fraction estimation. Regular imaging cameras have a signal to noise ratio of 50 db (or SNR of 316). Assuming photon counting detectors the probability density function for the input detected light is described by the Poisson distribution. However for signal to noise ratio of the order of 316 the difference between Gaussian distribution and Poisson distribution is negligible, therefore for convenience we shall use the Gaussian distribution. According to the multiple spectra solution presented above $a = F(S_1, S_2, S_3, S_4)$, and $$\frac{da}{dS_1} = \frac{\sum_{i=1}^{4} S_i \cdot K\_sun_i - S \cdot K\_sun_i}{S^2 \cdot \left( \sum_{i=1}^{4} K\_bulb_i^2 - \sum_{i=1}^{4} K\_sun_i \cdot K\_bulb_i \right)}$$

In order to calculate the noise influence on "a" estimation, the following assumptions are made: (i) The output signal of each one of the cameras 110 used is between 0 to 2 volts with an average value of 1 volt, and (ii) the probability density function of the output signals of each one of the cameras 110 is Gaussian with a standard deviation of 0.00316 volts (SNR=50 db).

Using the numerical values presented above it is possible to approximate the value of:

$$|g'_i(x)| = \frac{da}{dS_i} = |-0.895|$$

Assuming that the probability density function of S is given by:

$$f_S(S) = \frac{1}{(2 \cdot \pi \cdot \sigma^2)^{0.5}} \cdot \exp\left(-\frac{(S-1)^2}{2 \cdot \sigma^2}\right)$$

the probability density function of variable a is given by:

$$f_a(x) = \frac{\left[\frac{1}{0.895 \cdot (2 \cdot \pi \cdot \sigma^2)^{0.5}} \cdot \exp\left(-\frac{(x-0.5)^2}{2 \cdot \sigma^2}\right)\right]^4}{\int_0^1 \left[\frac{1}{0.895 \cdot (2 \cdot \pi \cdot \sigma^2)^{0.5}} \cdot \exp\left(-\frac{(x-0.5)^2}{2 \cdot \sigma^2}\right)\right]^4 dx},$$

where "a" is limited between zero to one $0 \leq a \leq 1$.

Figure 4A:
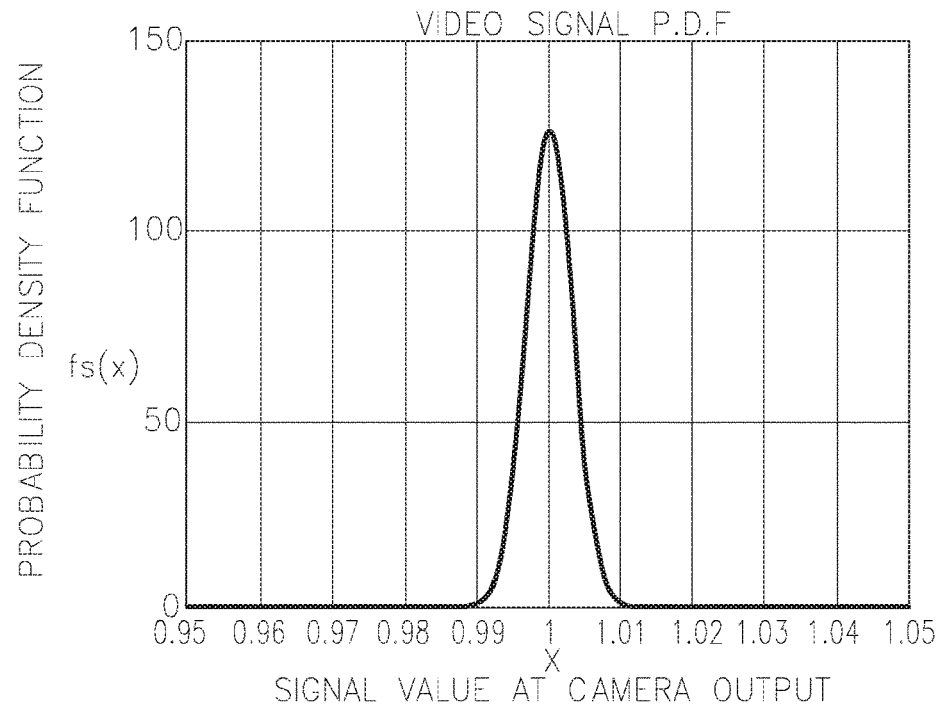
FIG. 4A describes the probability density function of the video signal at the output of the cameras used, according to some embodiments of the invention.
Figure 4B:
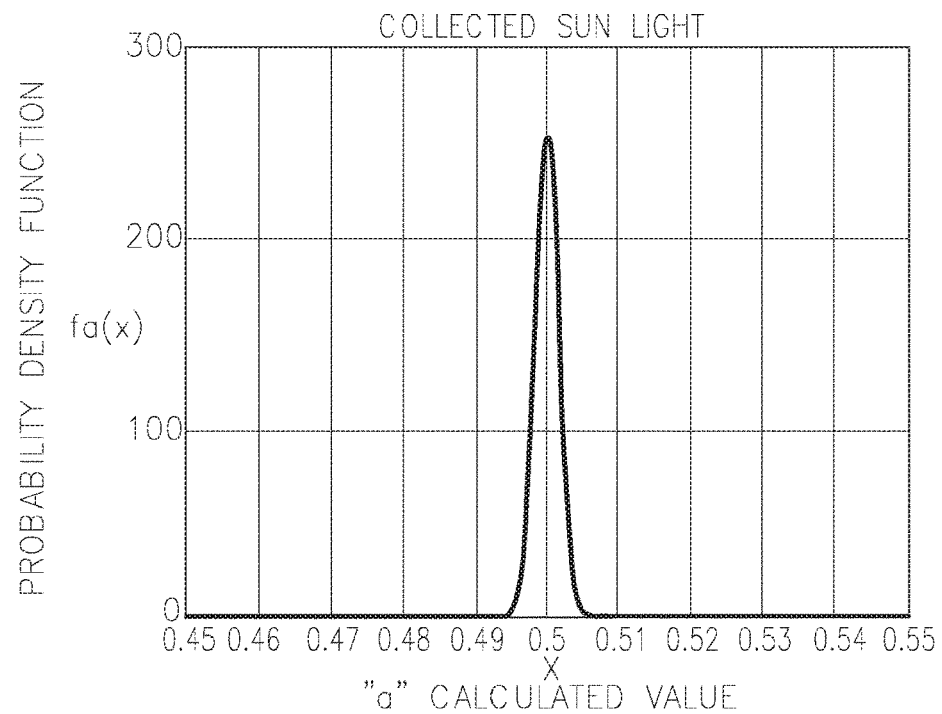
FIG. 4B describes the estimated probability density function of sun light collected fraction "a", according to some embodiments of the invention.

FIG. 4A describes the probability density function of the video signal at the output of the cameras 110 used, according to some embodiments of the invention. FIG. 4B describes the estimated probability density function of sun light collected fraction "a", according to some embodiments of the invention. The standard deviation of variable "a" is estimated by the following expression:

$$STD_a = \left[\int_0^1 (x-0.5)^2 \cdot f_a(x) \cdot dx\right]^{0.5} = 1.187 \cdot 10^{-3}$$

and the "a" average signal to noise is:

$$SNR_a = 20 \cdot \log\left(\frac{0.5}{1.187 \cdot 10^{-3}}\right) = 5.25 \text{ db}$$

Advantageously, system 100 and method 200 include a direct estimation the light fraction collected from light sources 90 such as runway lights and the light fraction collected from the sun without using any database.

The number of different spectral bands required is at least two and may be increased arbitrarily. Yet, practical requirements are limiting the number of different cameras used.

The camera 110 with the lowest signal to noise ratio dominates the estimated fraction "a" probability density function, due to the fact that the probability density function of the estimated fraction "a" contains the product of all the probability density functions of the cameras 110 used.

Hence, the camera with the lowest signal to noise ratio may be attenuated or removed from the calculation.

The estimated information can be used in very different ways: It can be used in order to enhance the contrast of the pixels, in one of the spectral bands collected for the fraction estimation, or in a different spectral band like MWIR, or a fused image, according to the amount of runway lights collected by each one of them.

The picture of the runway lights fractional values can be fused with any other image that describes the same view.

The picture of the runway lights fractional values can be used in order to automatically detect the runway lights by using only the video based information and or the runway lights structure geometry, or it can be used together with additional information provided by the inertial navigation systems, GPS information, etc.

The advantages of the present invention may be illustrated with respect to the shortcomings of e.g. prior art US2012007979 cited above. In US2012007979, particular spectral signatures of the specific light emitters in each airfield must be stored and compared to the measured spectral signatures, and furthermore, spectral characteristics of various atmospheric conditions must be stored and filtered out to achieve detection. Hence, the spectral signatures of the emitters and spectral characteristics of various atmospheric conditions must be measured in advance, maintained in databases and be retrieved in real-time for the detection. In particular, the detection process of US2012007979 cannot be carried out in airfields which were not previously measured. Moreover, the atmospheric conditions are not the only environmental conditions that affect the spectral parameters of the image. For example, the amount of vegetation and earth around the emitters, or the reflectance of the ground surrounding are of high importance the emitters and may change drastically under similar atmospheric conditions. Finally, US2012007979 requires the exact spatial position of the cameras with respect to the emitters to be measured prior to detection, a process termed "registration". Registration is mandatory for carrying out the procedure of US2012007979.

Advantageously, system 100 and method 200 dismiss with prior art limitations of the necessity to maintain databases of the configuration and particular spectral signatures of the airfield light emitters in order to complete the identification of the light emitters. System 100 and method 200 operate under any reflection condition, regardless of its source (e.g. atmospheric or ground). Furthermore, no registration process is required, as the method is carried out independently of prior data regarding the specific light sources and their spatial configuration. System 100 and method 200 solely require the general characteristics of sun light and incandescent bulbs illustrated in FIGS. 2A and 2B, and no specific data regarding specific light sources and environmental conditions.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A method of optimizing detection of known light sources, comprising:
    positioning a plurality of cameras having different spectral bands to have at least partially identical fields of view in respect to a view that contains the light sources;
    capturing images of the light sources by the cameras at different spectral bands;
    estimating, for each pixel and all cameras, relative fraction values of collected sun light and of collected light sources;
    deriving, for each pixel, an optimal fraction value of sun light indicating a probability that the pixel represents the collected sun light and an optimal fraction value of the light sources indicating a probability that the pixel represents the collected light sources, by minimizing, for each pixel, a mean square error estimation of an overall radiation with respect to the estimated relative fraction values, wherein a sum of the optimal fraction value of sun light and the optimal fraction value of the light sources, for each pixel, equals to 1;
    wherein the sun light is reflected sunlight.

2. The method of claim 1, wherein the positioning of the cameras is carried out to maximize a common field of view of the cameras.

3. The method of claim 1, further comprising resizing the captured images to yield equal instantaneous fields of view per corresponding pixels over all cameras.

4. The method of claim 1, further comprising normalizing the captured images to yield equal sensor output voltage to light energy input conversion ratios for all cameras.

5. The method of claim 1, further comprising identifying and attenuating the camera with a lowest signal to noise ratio to derive the optimal fraction values.

6. The method of claim 1, further comprising using the derived optimal fraction values to enhance at least one of: imaging by any one of the cameras and imaging by a camera in a different spectral range.

7. The method of claim 1, further comprising using the derived optimal fraction values to enhance fusion of the captured images.

8. The method of claim 1, further comprising using the derived optimal fraction values to detect runway lights as the light sources in video based information alone.

9. The method of claim 1, further comprising using the derived optimal fraction values to detect runway lights as the light sources by combining video based information and additional geographic information.

10. A system for detection of known light sources, comprising:
    a plurality of cameras having different spectral bands, positioned to have at least partially identical fields of view in respect to a view that contains the light sources, the cameras arranged to capture images of the light sources at different spectral bands; and
    a processor arranged to estimate, for each pixel and all cameras, relative fraction values of collected sun light and of collected light sources; and to derive, for each pixel, an optimal fraction value of sun light indicating a probability that the pixel represents the collected sunlight and an optimal fraction value of the light sources indicating a probability that the pixel represents the collected light sources, by minimizing, for each pixel, a mean square error estimation of an overall radiation with respect to the estimated relative fraction values, wherein a sum of the optimal fraction value of sun light and the optimal fraction value of the light sources, for each pixel, equals to 1,
    wherein the processor is further arranged to detect the light sources by applying the derived optimal fraction values; and
    wherein the sun light is reflected sunlight.

11. The system of claim 10, wherein the cameras are positioned to maximize a common field of view of the cameras.

12. The system of claim 10, wherein the processor is further arranged to resize the captured images to yield equal instantaneous fields of view per corresponding pixels over all cameras.

13. The system of claim 10, wherein the processor is further arranged to normalize the captured images to yield equal sensor output voltage to light energy input conversion ratios for all cameras.

14. The system of claim 10, wherein the processor is further arranged to use the derived optimal fraction values to enhance at least one of: imaging by any one of the cameras and imaging by a camera in a different spectral range.

15. The system of claim 10, wherein the processor is further arranged to use the derived optimal fraction values to enhance fusion of the captured images.

16. The system of claim 10, wherein at least two of the cameras share at least one of: an optical element and a detector.

17. The system of claim 10, wherein the cameras comprise one camera in the visual range and at least one camera in the infrared range.

18. The system of claim 10, wherein the light sources are incandescent.

19. The system of claim 10, wherein the light sources are LEDs and the cameras comprise at least one camera outside of the spectral range of the LEDs.

20. The system of claim 10, wherein the light sources are runway lights and the processor is further configured to detect the runway light using video based information alone.

21. The system of claim 10, wherein the light sources are runway lights and the processor is further configured to detect the runway light by combining video based information and additional geographic information.

22. The system of claim 10, wherein the plurality of cameras is realized by a plurality of detectors having shared optics.

* * * * *